P. C. KREITZ.
VALVE FOR INTERNAL COMBUSTION ENGINES.
APPLICATION FILED FEB. 2, 1911.

1,052,005.

Patented Feb. 4, 1913.

ATTEST
E. M. Fisher
F. C. Mascow

INVENTOR
PHILLIP C. KREITZ
BY Fisher & Moore ATTYS.

BEST AVAILABLE COPY

UNITED STATES PATENT OFFICE.

PHILLIP C. KREITZ, OF CLEVELAND, OHIO.

VALVE FOR INTERNAL-COMBUSTION ENGINES.

1,052,005.  Specification of Letters Patent.  Patented Feb. 4, 1913.

Application filed February 2, 1911. Serial No. 606,084.

*To all whom it may concern:*

Be it known that I, PHILLIP C. KREITZ, a citizen of the United States, residing at Cleveland, in the county o Cuyahoga and State of Ohio, have invented certain new and useful Improvements in Valves for Internal-Combustion Engines, of which the following is a specification.

My invention relates to valves for internal combustion engines and the invention consists of a valve constructed of different metals and parts and adapted to meet the conditions of service in a better and more durable way than heretofore, all substantially as shown and described and particularly pointed out in the claims.

Figure 1:
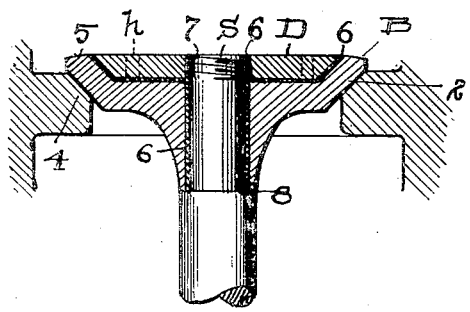
Figure 2:
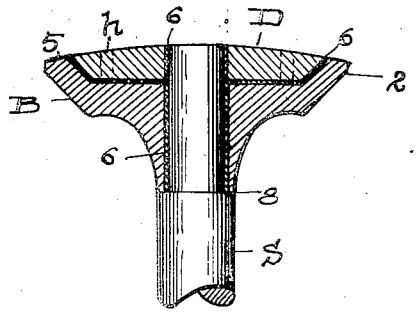
Figure 3:
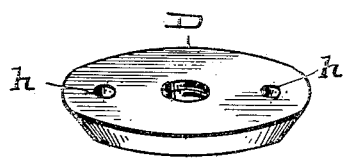
Figure 4:
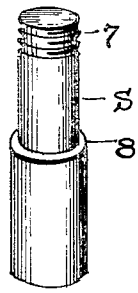
Figure 5:
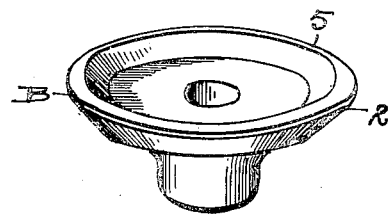

In the accompanying drawings, Figure 1 is a cross section of the valve according to one manner of constructing the same, and Fig. 2 is a cross section thereof according to another manner of construction. Fig. 3 is a perspective detail of the steel disk, and Fig. 4 is a perspective view of the valve stem as shown in Fig. 1. Fig. 5 is a perspective detail of the cast metal head.

The valve as thus shown and described is designed to be used more especially in internal combustion engines wherein the wear and tear upon valves by incessant pounding and incidental strain is exceedingly severe and for which reason the life of an ordinary valve is short and its frequent replacing becomes expensive and troublesome. These conditions and experiences being well known there have been many and varied experiments to overcome the same and supply a durable and comparatively cheap construction of valve. My present invention has these latter objects in view and the valve shown has proved by repeated and protracted tests under ordinary hard conditions capable of meeting the requirements. To this end the said valve is preferably made with three original parts or pieces of different metals which are chosen according to the service they are to perform and endure in actual work, and particularly is this true of the head or body B of the valve. As these valves, or valves for this use, are ordinarily constructed they are substantially flat on top and have beveled or tapered edges 2, adapted to occupy seats 4 correspondingly tapered, and so far as I know and believe the entire valve or valve body has always heretofore been cast or made in one piece. As to this, there have been different metals tried for this purpose and some have given better satisfaction than others according to their hardness and other wearing qualities, but the place is a hard one and the test for endurance severe under the most favorable conditions, so that it cannot be said that any one single metal valve has withstood the work satisfactorily. Now, I have conceived the construction of the valve herein to meet these conditions and which has a cast iron body with the usual tapered or beveled and ground edge 2 formed over a comparatively thin rim 5 of substantially uniform thickness its full depth and having its inner side flaring corresponding to the outer side 2. This produces a substantially saucer shaped top to the said body B and the saucer space within said rim 5 is filled or occupied by a close fitting steel disk D. Two ways of securing the said disk are shown, one by threading the valve stem S at its upper end 7, Fig. 1, and the other by leaving the end of the stem unthreaded, Fig. 2. In both cases the end of the stem is somewhat reduced where it enters disk B and has a slight shoulder 8 on which the valve body rests. In both cases also the said disk is brazed in said head and on said stem so that the three parts are unified and made as one. The brazing is represented by 6. This in a sense produces a composite valve, with comparatively soft wearing metal in its seating portion and a hard and firm backing D in sustaining relation to the bearing rim 5, while the stem S is still another part of a different metal carrying said head and disk. In operation with valves of this general character or located as this valve is designed to be the valve is opened by a cam and closed by a spring, not shown, the whole making the severe operation above referred to. I have met these conditions with my valve by making the actual seating portion B of a comparatively soft metal which will, however, endure the wear and tear in so far as seating is concerned, and by reason of the steel reinforcement which is incorporated therewith gives the said seating portion the practical value of steel in strength and durability. Generally an all cast iron valve is liable to be split at the weakest point across the edge and to be disabled in this way, but the steel backing by disk D prevents such cross splitting and gives the valve an indefinitely prolonged life which an all cast iron valve does not possess. If, for any possible reason, the two metals in Fig. 1 should separate the screw connection or stem S will hold them together but my plan and purpose are to so perfectly amalgamate said metals as to make them one. Two holes $h$ are shown in the top of disk D which, among other things, serve to insert an instrument to rotate said disk on standard S into threaded engagement therewith, as seen in Fig. 1.

It will be particularly noted that disk D is of a diameter great enough to permit its beveled edge to overlap the base of the inclined or tapering seat portion of flange 5—the point of breakage generally. This reinforcement produces a strong and unbreakable construction, and has the further advantage of lessening the weight of the valve as compared with an all cast iron valve, thereby lessening the pounding actions on the valve and seat. Furthermore, the use of a cast iron body eliminates pitting and burning thereof by carbon deposits and consequent destruction of a perfect seat,—a fault often observed in steel and nickel-steel valves.

What I claim is;

1. A valve consisting of a cast iron head with a flange of substantially uniform thickness in inclined relation about the top thereof and providing a recess within its borders, a steel disk fitting said recess and brazed to said head, and a valve stem of steel engaged through both said head and disk.

2. A beveled valve consisting of an iron head of substantially saucer shape at its top, a separate disk of wrought metal laid into the top of said head to extend over its beveled edge, said head and disk being brazed together, and a stem having a brazed union with both said head and disk.

3. A valve consisting of a head of soft iron having a beveled edge and provided with a separate stem of wrought metal brazed thereto at its center, and a separate wrought-metal disk secured to said stem at the top of said head to reinforce the said iron head at its beveled edge.

In testimony whereof I affix my signature in presence of two witnesses.

PHILLIP C. KREITZ.

Witnesses:
  E. M. Fisher,
  R. B. Moser.